United States Patent [19]
Phillips

[11] Patent Number: 6,095,094
[45] Date of Patent: Aug. 1, 2000

[54] PET LOCK COLLAR LEASH

[76] Inventor: Ellen Deborah Phillips, 3603 Blanche Rd., Cleveland Heights, Ohio 44118

[21] Appl. No.: 08/921,631

[22] Filed: Aug. 27, 1997

Related U.S. Application Data

[60] Provisional application No. 60/024,620, Aug. 27, 1996, and provisional application No. 60/038,924, Feb. 22, 1997.

[51] Int. Cl.[7] .................................................. A01K 1/06
[52] U.S. Cl. ................................................. 119/792
[58] Field of Search .................................. 119/769, 770, 119/771, 772, 776, 792, 793, 795, 797, 798, 856, 863, 864, 865

[56] References Cited

U.S. PATENT DOCUMENTS

| | | | |
|---|---|---|---|
| D. 359,599 | 6/1995 | Archambault . | |
| 904,530 | 11/1908 | Harlow | 119/856 |
| 2,994,300 | 8/1961 | Grahling | 119/856 |
| 3,104,650 | 9/1963 | Grahling | 119/856 |
| 3,768,445 | 10/1973 | Sorrels | 119/856 |
| 3,867,905 | 2/1975 | Vail . | |
| 3,884,190 | 5/1975 | Gurrey . | |
| 4,398,500 | 8/1983 | Koronkiewicz . | |
| 4,621,589 | 11/1986 | Thinnes . | |
| 5,174,246 | 12/1992 | Driver . | |
| 5,462,019 | 10/1995 | Hong-Rong . | |
| 5,485,811 | 1/1996 | Jacobsen . | |

*Primary Examiner*—Thomas Price
*Attorney, Agent, or Firm*—Fay, Sharpe, Fagan, Minnich & McKee

[57] ABSTRACT

The present invention is drawn to a secure pet collar and leash assembly which provides an ergonomically designed leash handle for walking a pet which also may lock a loop of the leash around a fixture to prevent removal thereof. The other end of the leash provides a clasp lock which locks a collar retaining assembly around the pet's neck to prevent the removal thereof. The leash is made of sturdy wire braided material making the cutting or sawing thereof difficult if not impossible to provide a secure-theft-proof pet retaining system.

2 Claims, 6 Drawing Sheets

PET LOCK COLLAR LEASH

This application is based on benefit of priority of provisional application Ser. No. 60/024,620 filed Aug. 27, 1996 and Ser. No. 60/038,924 filed on Feb. 22, 1997.

BACKGROUND OF THE INVENTION

1. Field of the Invention

The present invention relates generally to animal leashes having locking mechanisms for preventing the unauthorized release or theft of the animal and more particularly to ergonomically designed sequence locking mechanisms for same.

2. Description of the Prior Art

Animal leashes are known which have some form of locking mechanism. Some such know leashes lock the collar space around the neck of the animal or lock the opposite end of the leash around some permanent object such as a pole or tree. Other known leashes provide locks for both the animal collar and the opposite lease end.

An example of the first mentioned single lock leash is found in U.S. Pat. Nos. 5,462,019 issued to Shiau Horg-Rong et. al.: 5,174,246 issued to Wilfred D. Drier and 3,867,905 issued to Richard Vail Jr. All of these patents teach the use of a lock mechanism to wrap the handle end of the leash around some permanent obstacle and to then keep it in place. The lock is usually some protrusion that engages a chain link used as the leash. In other cases it is some form of snap device formed at the end of a cable leash which engages an eyelet connected to the same leash. When unlocked the handle end forms a simple loop which the animal handler may loop around his wrist. This type of handle is not only cumbersome to hold but may even cause

DETAILED DESCRIPTION OF THE PREFERRED EMBODIMENT

Figure 1:
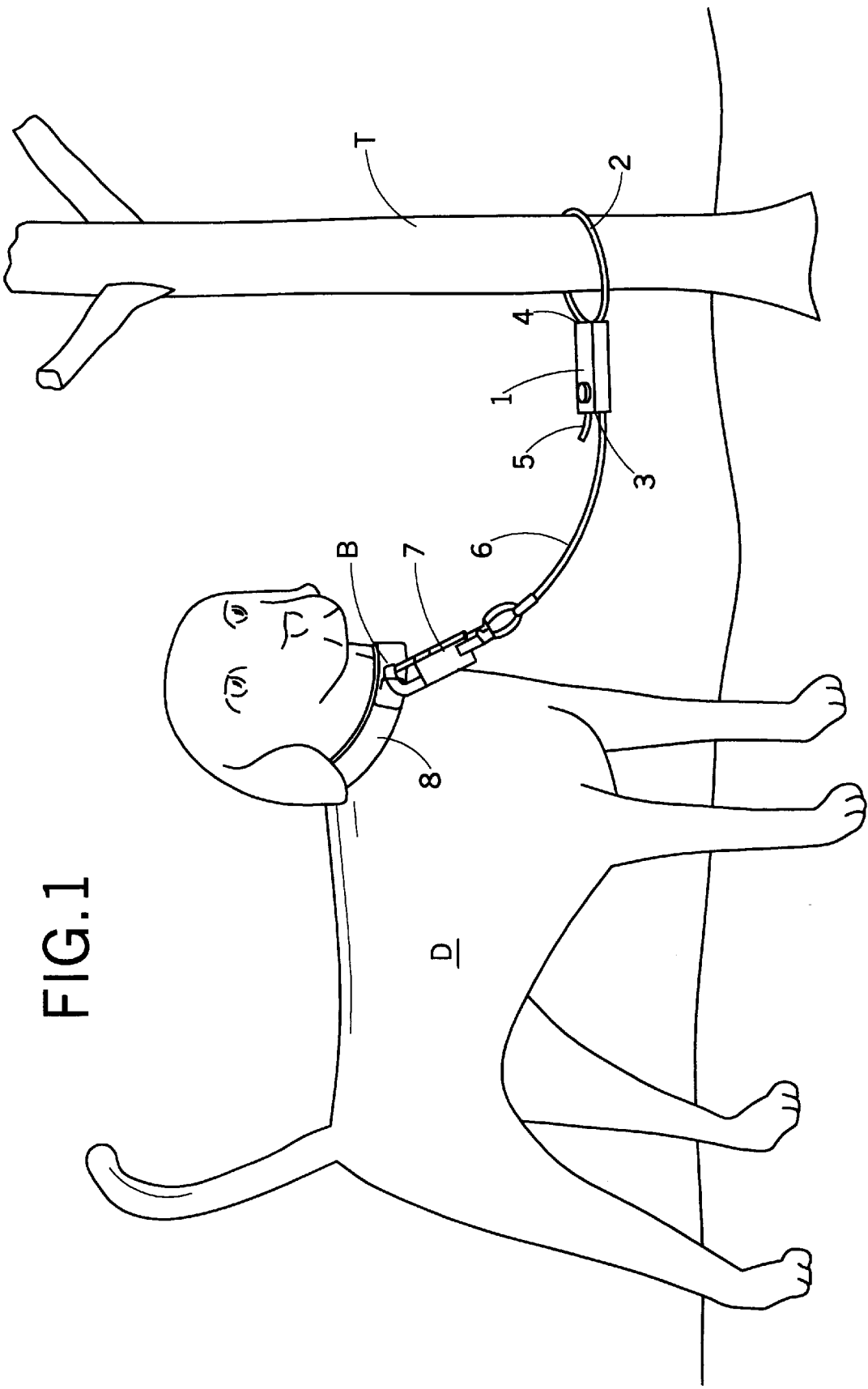
FIG. 1 is a depiction of the animal leash system of the present invention where the pet (D) is shown locked at the collar end and also locked at the handle end to a solid, relatively immovable object, such as in the present illustration, a tree (T).

Referring now to the drawings where the showings are intended to disclose preferred embodiments of the invention but not to limit the invention thereto. FIG. 1 shows in this case, a dog, (D), secured to a tree, (T), by means of the lockable leash and collar system (Pet-Lock). Pet-Lock is composed of three major elements: a lockable handle (1); a lockable sliding clasp (7) permanently attached to a metal cable leash means (6); and a non-slip cam collar buckle unit (B) (or standard buckle for different embodiment) permanently attached to a reinforced (metal or metal cable) collar means (8).

The lockable handle (I) provides means to be described in detail in subsequent illustrations such that the metal cable leash (6) leading from the pet is readily passed through the first of two channels (3) to then form a loop (2) which is shown for purposes of this illustration to be passing around a tree (T) and again passing through the second channel (4) in the handle (1). The free end (5) can be readily adjusted to any desired length prior to locking handle (1) to accommodate thin or thick stationary objects and to provide the desired length of leash between the stationary object, a tree (T) in this illustration and the pet animal (D). As will be shown in subsequent illustrations, the handle system means provides for individual adjustment of the leash length to the animal (cable leash segment entering channel (3)) and independent adjustment of the leash length needed to form the loop size (cable leash segment entering channel (4)) ensuring full control of the pet animal at all times while attaching, adjusting or removing the metal cable leash. The size and shape of the handle means (1) also has an ergonomic design which facilitates such functions as locking, adjusting, unlocking, or walking the pet animal with one hand.

Figure 2:
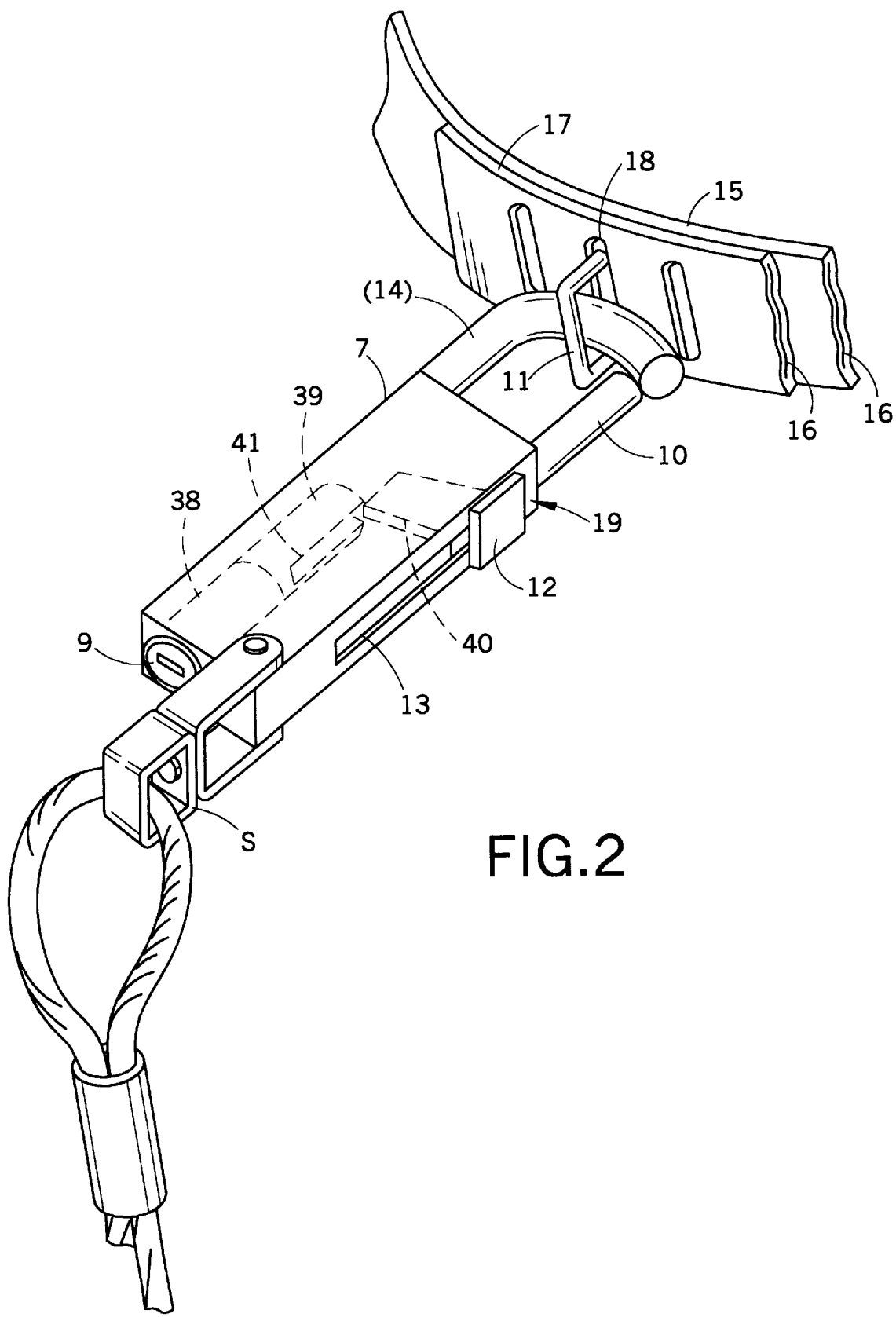
FIG. 2 is a depiction of the lockable sliding clasp shown in an unlocked position. When in locked position, the lockable sliding clasp prevents the pet collar from undesired removal by means of the metal loop and eyelet slot means shown in the metal reinforced collar means. Also shown is a swivel means to prevent twisting of a permanently attached metal cable leash.

In FIG. 2, the distal end of the metal cable leash (6) opposite the housing (1) is permanently affixed to a sturdy swivel-ring (S) located towards the end of the lockable sliding clasp (7). The swivel-ring (S) permanently attaches to the lockable sliding clasp (7) in a manner which allows it to rotate to the side, thereby exposing a key-hole (9). The lockable sliding clasp has a key hole (9) which uses the same key as the lockable handle (1). The main feature of this lockable sliding clasp (7) is its ability to be locked in a closed position with use of a key, in addition to having normal movement when in the unlocked position.

In FIG. 2, the lockable sliding-clasp assembly (7) has an internal, key-activated locking mechanism (38). With the lock deactivated, this unit will function as a normal sliding-clasp which has an external thumb-hitch (12) which allows the user to operate the sliding pin (10) in the traditional fashion for a typical sliding-clasp. An internal spring (13) automatically returns the sliding pin (10) to the closed position once the user ceases applying pressure on the thumb-hitch (12). Once the lock (38) is activated by the key, the sliding pin (10) will remain fastened until the lock is deactivated.

Figure 8:
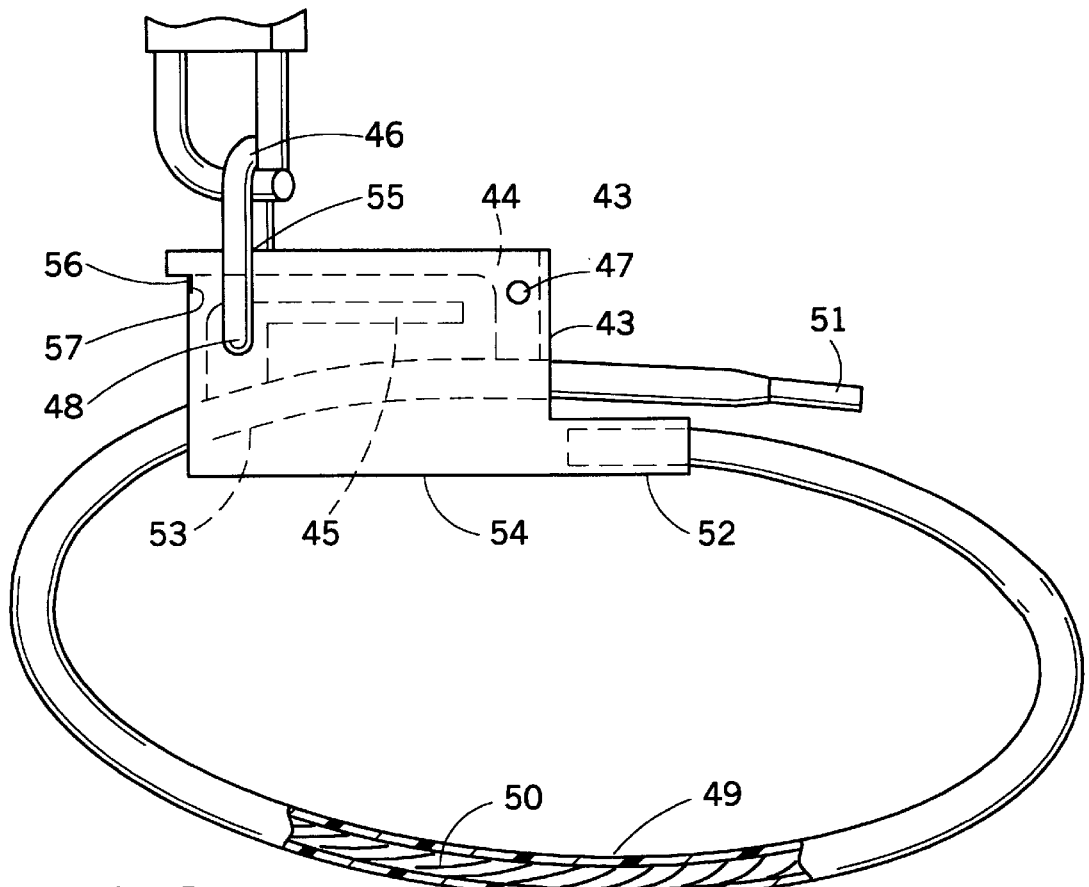
FIG. 8 illustrates a cut-away cross-sectional view of an embodiment of a metal cable reinforced collar and a non-slip cam collar buckle with a fitted hinged lid or cover. Depicted on the top side of the lid is a cutout slot through which a metal C shaped loop protrudes for the purpose of attaching the lockable sliding clasp.
Figure 9:
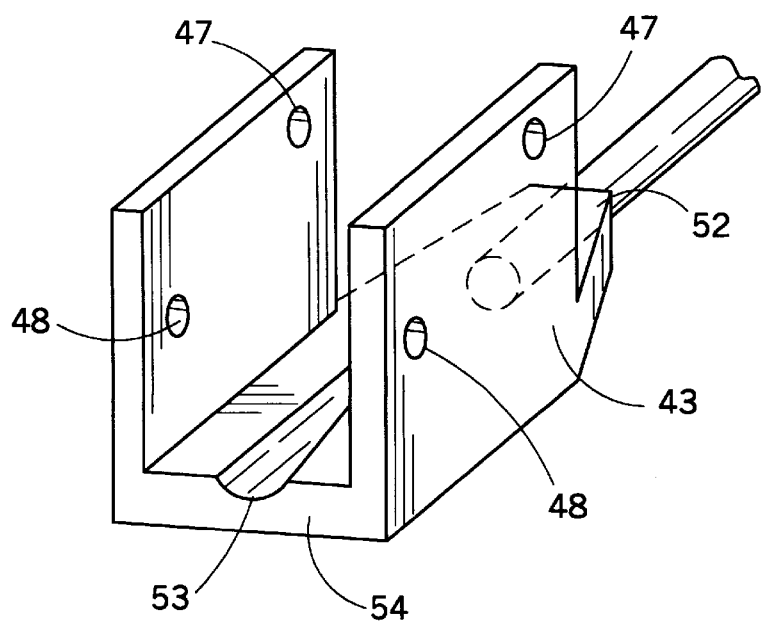
FIG. 9 is a partial front-view illustration of the non-slip cam collar buckle unit. This view illustrates more clearly, the semi-circular groove in the floor of the buckle unit through which the free end of the collar passes.

The clasp has a smooth, "G" shaped curve (14) to its "hook" which easily fits into the metal loop (11) or ((46) in FIG. 8) when the sliding pin (10) is open. The key-hole (9) for this lockable sliding-clasp is located at the opposite end from the hook (14). The internal locking mechanism (38) consists of a rotating cylinder (39) which has a grooved channel, or cut-out (41), running longitudinally in its side. This rotating cylinder (39) is attached to the key lock (38), and will rotate ninety degrees on its longitudinal central axis when the key is turned counter-clockwise in the lock. An internal block, or bar (40), extends internally from the sliding pin (10), and has the same profile as the grooved channel cut-out (41) in the rotating cylinder (39). This internal block (40) is a permanent part of the sliding pin. Within the sliding clasp unit (7), the long axes of the rotating cylinder and sliding pin run parallel to one another. Their axes are offset such that the internal block (40) on the sliding pin is prevented from moving by the solid portion (39) of the cylinder located adjacent to the cut-out (41). The sliding pin is held securely in a track and it is only able to move along its longitudinal axis, prevented from lateral or rotational movement.

Therefore, the rotating cylinder will not rotate when the internal block of the sliding pin is within the groove cut-out, as the sliding pin is unable to rotate on its central axis. The rotating cylinder is firmly attached to the key-lock mechanism, and both are securely affixed within the sliding clasp unit so that their only freedom of movement (with respect to the rest of the sliding clasp) is rotational; the key-lock will only activate when the key is turned in the lock. The sliding pin cannot be opened while the lock is activated.

In FIG. 2 the sliding clasp secures the collar from removal. A substantial metal loop (11) is permanently attached to the collar near the buckle end (15) of a collar fabricated from two layers of suitable natural or synthetic flexible material (tubular webbing for example) means that sandwiches flexible metal cable or other metal reinforcement means (16) that completely encircles the collar means. The free end of the collar (17) has a plurality of metal trimmed eyelet slot means (18) to accept the metal loop means (11) provided near the buckle end means (15). The slot means (18) are spaced at the same intervals as the holes provided for the buckle means (not shown as buckles are well known in prior art) such that for any adjustment of the collar buckle means to fit the neck of a pet animal, the slots also align with loop means (11). The buckle holes and the slot means are provided in equal numbers and are in close proximity tot he buckle end (15) and are also protected from disconnection of the buckle means by suitably placed keepers on the collar between the loop (11) and the buckle. The metal reinforcement means (16), while providing adequate flexibility and comfort for the pet animal, is intended to provide resistance from all but the most determined efforts to sever the collar means. The lockable sliding clasp (7) can be released without disturbing the function or utility of the collar means (15–17).

Figure 7:
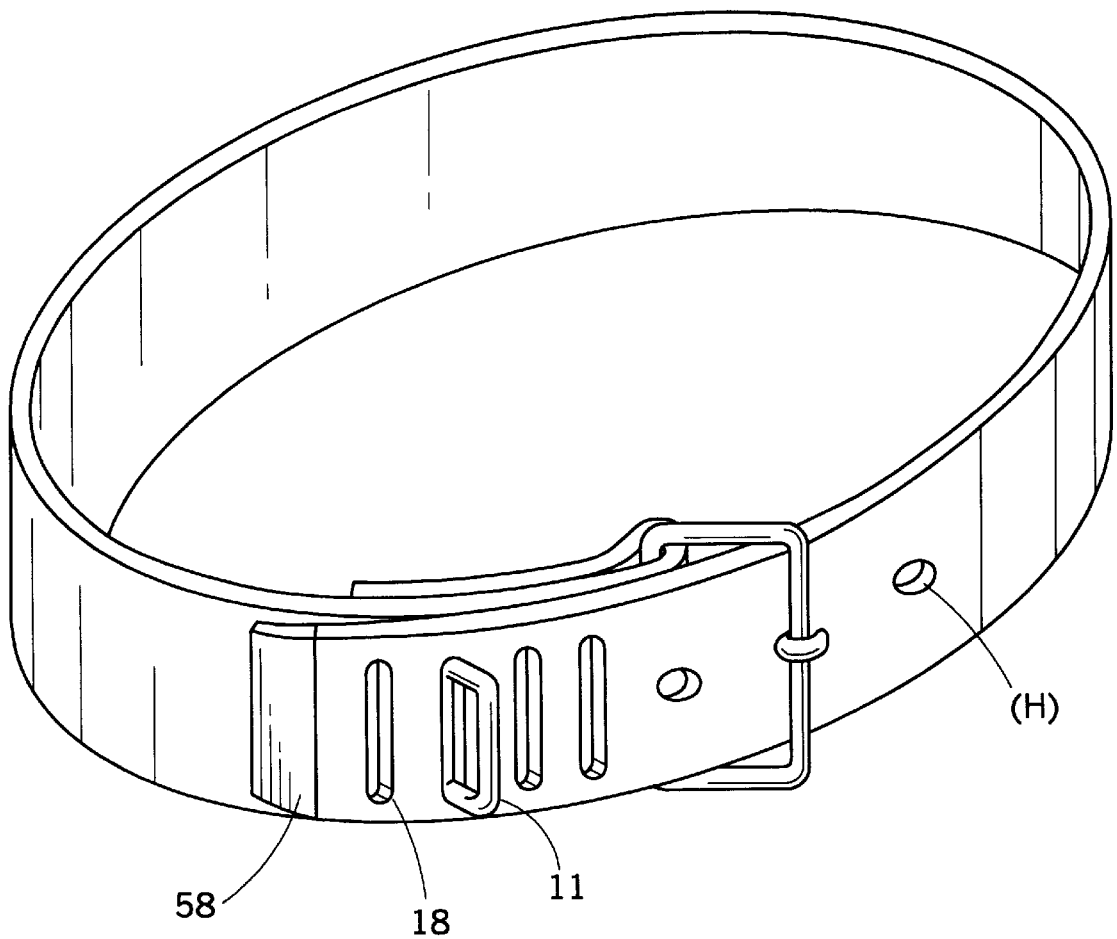
FIG. 7 is a full illustration of an embodiment of a reinforced (by metal or metal cable) collar depicting a metal loop and eyelet slot means. The lockable sliding clasp attaches to the metal loop.

In FIG. 7, a metal endplate (58) secures metal cable or other metal reinforcement means running through tubular collar webbing. Pin holes provided for the collar buckle are illustrated (H).

In FIG. 8, the non-slip cam collar buckle unit is composed of 6 separate pieces: the outer housing (43), the hinged-cover (44), the inner cam-buckle (45), the "C-ring" (46), and two sets of hinge-holes which accept the hinges for the hinged-cover (47) and the hinge for the inner cam-buckle and "C-ring" (48) respectively.

The collar is composed of three pieces: synthetic or natural tubular webbing (49), braided stainless metal cable (50), and a flattened metal end-plate (51). The collar is made of braided stainless metal cable housed within tubular webbing, making it difficult for potential thieves to cut, saw through, or sever the collar.

The cable and tubular webbing are secured at the "free end" of the collar by a flattened metal endpiece (51). The cable is permanently attached to the non-slip cam collar buckle unit inside a cylindrical chamber in the collar-buckle housing piece (52) by means of epoxy, screws, or pins. The synthetic tubular webbing (49) is attached about the outside of this cylindrical chamber (52) on the buckle unit by similar means.

The outer housing component has a semi-circular groove (53) in its "floor" (54) opposite the end at which the collar cable and buckle are permanently attached. It is through this groove (53) that the free end of the collar (cable and tubular webbing) enters, as it passes through the non-slip cam collar buckle unit.

The collar buckle (43) is a non-slip cam mechanism which is oriented in such a manner that gripping force exerted by the cam-buckle (45) upon both the tubular webbing and cable is increased when the collar is pulled through the buckle in the direction which would increase the collar circumference.

This non-slip cam collar buckled has a semicircular groove (53) in the surface beneath which the collar webbing, and its inner cable pass. This groove guides and retains the cable within the flattened tubular webbing. The surface of the cam-buckle which interfaces with the collar webbing and cable has a knurled surface, which increases its ability to hold the collar webbing and cable.

The cam-buckle hinges at the end of the non-slip cam collar buckle unit opposite the end to which the collar webbing and cable are permanently affixed. This hinge is set somewhat beneath the top of the side-walls, so that the closed/locked cam-buckle lever is parallel to the top of the side-walls. There is a space above the cam lever which allows access to the lever arm.

This access is denied when the hinged-cover (44) is closed. The hinged-cover has its hinge closer to the top of the side walls, located at the end of the housing to which the collar is permanently attached. Viewed from the side, the hinged-cover (44) has a sideways-reversed-"L" profile, with the hinge at its vertex. The free end of the collar will easily pass through the non-slip cam buckle in the direction which closes/tightens the collar.

In order to release the collar, its is necessary to lift up the lever-bar (45) attached to the cam buckle.

The non-slip cam collar buckle (43) cannot be released without the lever (45) being raised up, away from the collar webbing.

This inner cam-buckle lever (45) is concealed from access by a hinged outer cover (44), which hinges at the opposite end of the collar buckle from the cam lever's hinge.

This outer cover (44), when closed, denies access to the cam lever (45), and prevents the cam lever from rotating upwards (which would release the collar).

A metal "C-loop" (46) protrudes up from the hinge of the non-slip cam collar buckle unit. This C-loop passes through a cut-out slot (55) in the lever end of the hinged-cover distant from its own hinge (48).

The lockable slidling clasp (7) attaches to the C-loop (46) thereby preventing the cover (44) from being opened. Access to the cam-lever (45) is thereby blocked, preventing release of the collar.

The outer cover (44) "snaps closed" due to the articulation between a small protrusion on the hinged cover (56) which matches up with a corresponding notch (57) in the outer housing.

This snap mechanism holds the outer cover closed when the C-ring is not secured to a sliding clasp; similarly, with the C-ring unattached, the hinged cover is readily opened/ released with the application of minimal upward force exerted under the free end of the hinged-cover.

Figure 3:
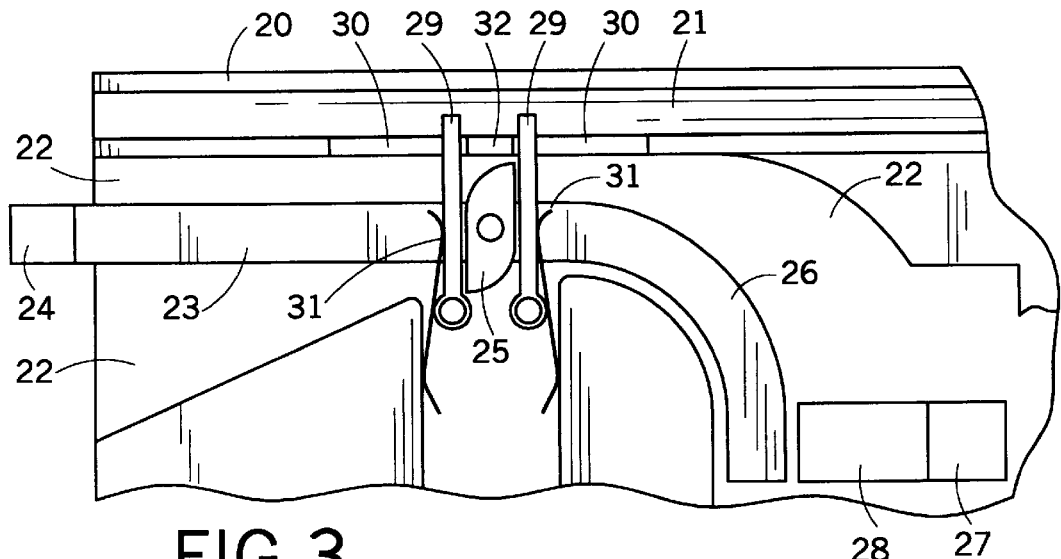
FIG. 3 is a partial depiction of the handle lock by which metal cable leash means is securely locked into the handle means. One of two identical and symmetrical internal locking mechanism means is illustrated in the locked position whereby the metal cable leash means cannot be moved in either direction.
Figure 4:
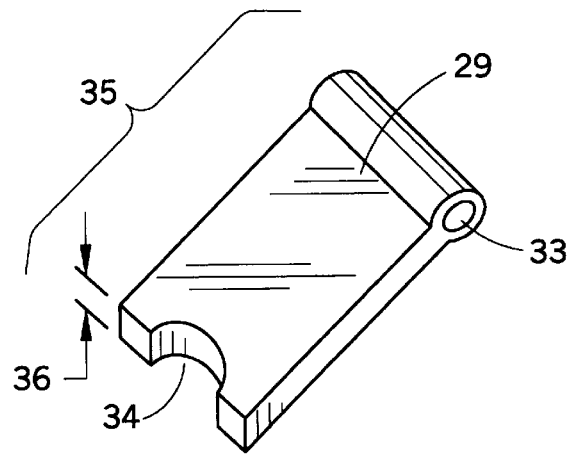
FIG. 4 illustrates detail of one of the four identical lockable cam means which prevent movement of the metal cable leash.
Figure 5:
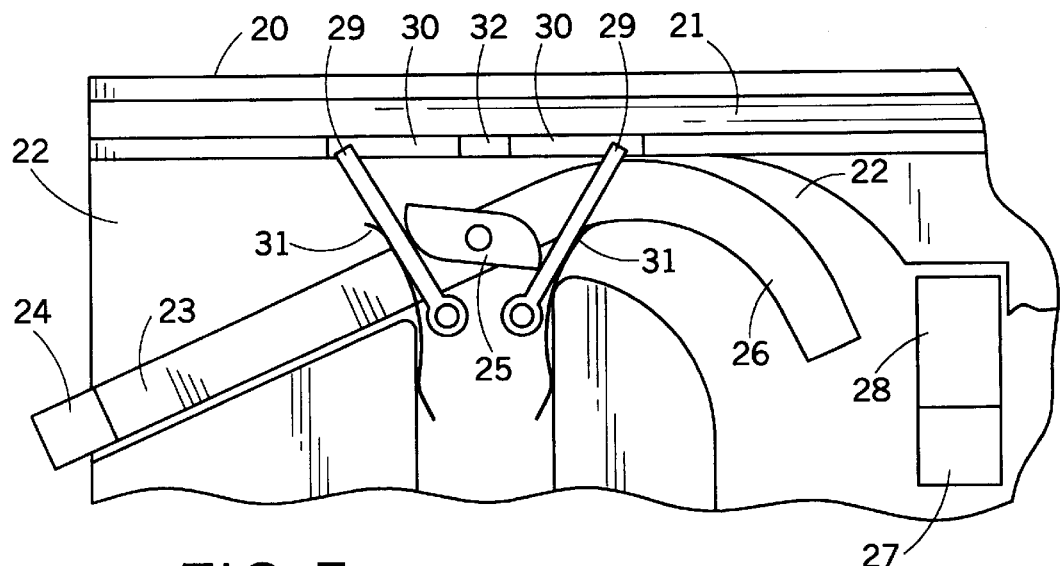
FIG. 5 illustrates the cable leash locking mechanism in the released position, allowing free movement of the metal cable leash in either direction.

The internal mechanical details of the locking handle are presented in FIGS. 3 through 5. FIG. 3 shows the various internal mechanical components which provide two-way locking for cable leash segment entering channel (3) and cable leash segment entering channel (4) of the singular cable leash as it passes through the handle lock means (1). A partial section (20) of handle means (1) is represented by the outline drawing. The internal features include the channel (21) providing means for the cable leash segment entering channel (3) and cable leash segment entering channel (4), cavity (22) which provides space for operation of the release lever (23), lockable mechanism (27,28) and cable lockable pawls (29), and return springs (31). The lever means (23) has design features of a tab (24) for easy release of the cable from the secure locked position shown in this figure, a cam (25) which will release cable lockable pawls (29) from their secure grip on the cable segments (3,4), and a curved section (26) which provides means for immobilizing the lever (23) by the lockable mechanism (27). The lockable mechanism (27) is shown in the locked position where a moveable means (28) prevents movement of lever (23) which in turn prevents release of the two cable lockable pawls (29) from engagement with the cable segments (3,4). A raised protrusion (32) is provided between the cable locking pawls (29) to prevent either pawl from being moved past the maximum gripping position on the cable.

This means is analogous to the action of a "sprag clutch", well known to those skilled in the mechanical arts. A sprag clutch permits free motion of the restrained body in one direction and prohibits motion in the opposite direction the greater the stress applied in the direction of restraint. The sprag clutch creates increased holding power. When two such devices are placed in opposing array, no movement will be possible, as each device prevents movement in one direction. Further, the greater the effort applied to defeat the retention, the greater the retentive effort. The retentive force is readily released by moving lever (23) in the downward direction in the present illustration once lockable means (27) is actuated by turning the key and rotating the moveable means (28) out of the arc of lever (23) curved extension (26) as the lever is moved. The cam means (25) fixed to lever (23) causes separation of the two cable lockable pawls (29) through the cavity area (30) and hence provides release of cable segments (3,4). Flat springs (31) apply initial pressure to cable locking pawls (29) and assure secure initial engagement of metal cable leash segments in channels (3,4).

Detentes are provided in recessed area (22) to permit engagement of lever (23) at the fully released position, allowing the user to make adjustments in the length of metal cable leash segments (both 3 and 4) with one hand thereby freeing the other hand to maintain control of the pet animal at all times.

FIG. 4 illustrates the design of cable locking pawl (29) wherein a pivot means (33) provides for free movement of pawl (29) and provides mechanical resistance to the clamping force generated from metal cable leash retention (3,4). The cutout means (34) increases the gripping force applied to the metal cable leash (3,4) aided by the leverage generated by length (35) and contact area provided by thickness (36).

FIG. 5 illustrates the handle lock in the unlocked and released position for comparison to FIG. 3 which illustrates the handle lock in the locked and restrained position. Consideration of both states teaches the operation of the metal cable leash retention and release mechanisms.

Figure 6:
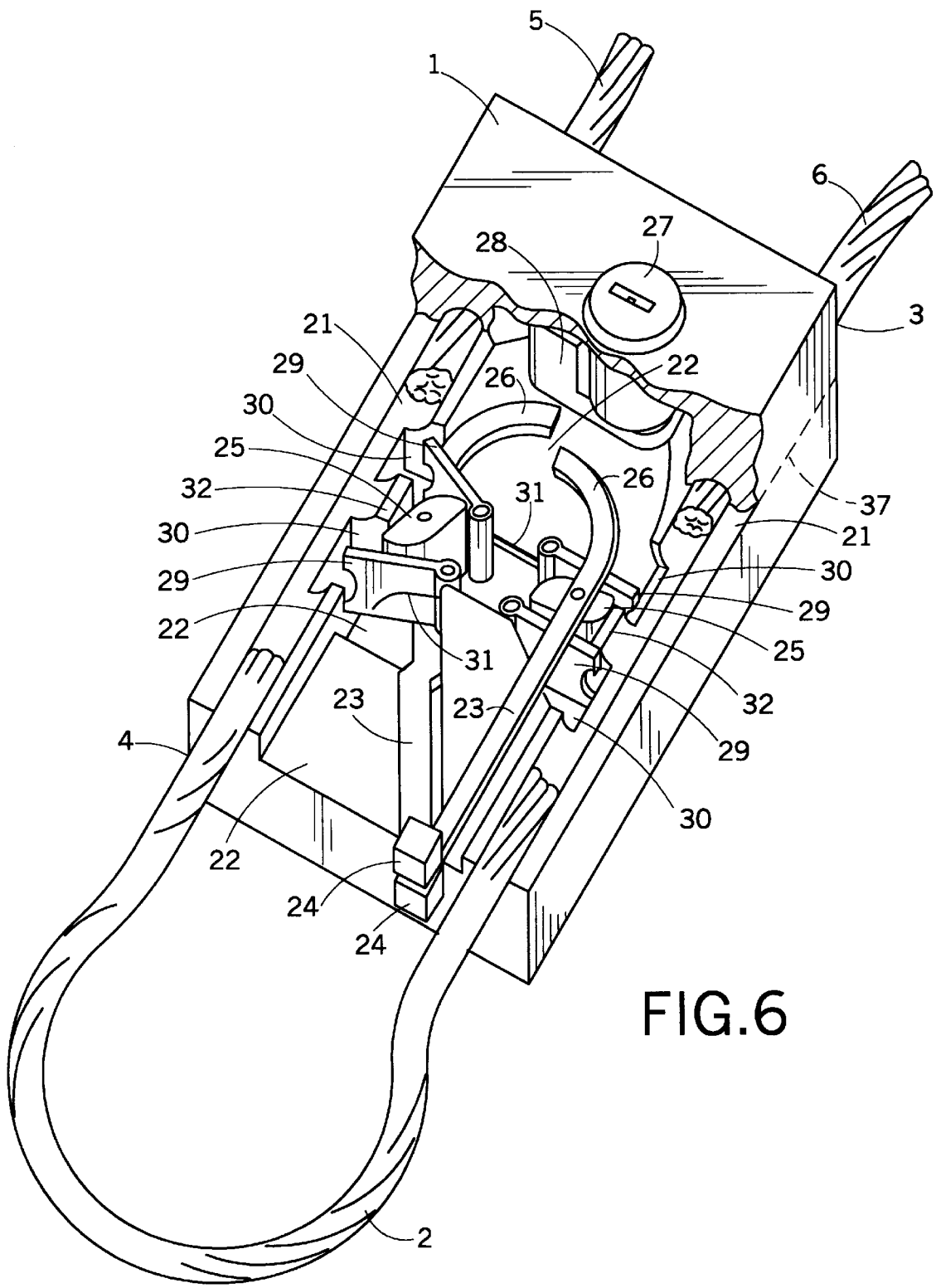
FIG. 6 illustrates a partially cutaway isometric view, of the complete handle locking means. Shown is the relationship of the internal mechanism for securing and/or releasing either or both segments of the singular metal cable leash. This isometric view shows the handle locking means with one segment of the cable in the released position, a second segment of the cable in the restrained position, and the key activated lock means in the unlocked position.

FIG. 6 which is a partial cutaway view of the handle lock (1) illustrates the relationship between locking and release mechanisms for both cable leash segments entering channels (3,4) . One of the symmetrical levers (23) controlling metal leash cable segments (4,5) is illustrated in the released position. The other symmetrical lever (23) controlling cable leash segments (3,6) is illustrated in the restraining mode. Lock means (27) is illustrated in the unlocked position whereby moveable means (28) is rotated permitting movement of either symmetrical lever (23) .

Handle lock (1) is composed of two identical halves joined permanently along dotted line (37) with the sole exception that key locking means (27,28) is provided on the upper half only of the two component halves. All other internal and external details of the handle lock are identical (1). For clarity, metal cable leash segments (3,4,5,6) are illustrated with their center section removed to reveal juxtaposition of internal parts (23,27,29 and 31). The handle lock assembly (1) is composed of only four distinct internal parts. Lever (23) has suitable curvatures which permit free operation of either lever and separately or simultaneously the curved area (26) to permit engagement of moving lock element (28) and hence restrain movement of both levers (23) simultaneously.

Not shown in FIG. 6 are external ergonomic features of handle lock (1) including, but not limited to, rounding of all corners, finger grooves at long edges, and means to attach the two halves.

What is claimed is:

1. A theft-resistant animal leash system for securely tethering an animal to a support structure, said leash system comprising:

a leash including a proximal end adapted for connection to said support structure and a distal end adapted for connection to said animal;

a collar for placement around a neck region of said animal, said collar including a buckle having a first operative position, allowing adjustment of said collar for placement and removal of said collar about said animal neck region, and a second operative position preventing adjustment of said collar;

a clasp connected to the distal end of said leash, said clasp adapted for selective connection to said collar buckle when said collar buckle is in said second operative position to prevent said buckle from assuming said first operative position; and, a locking mechanism operatively connected to said clasp, said locking mechanism selectively lockable to prevent unauthorized operation of said clasp and disconnection of said clasp from said collar buckle to thereby prevent unauthorized movement of said buckle into said first operative position and theft of said tethered animal.

2. A method of securing an animal against theft by an unauthorized person, said method comprising:

- placing a collar around a neck region of the animal and tightening said collar through use of a collar buckle so that said collar has an operative size for securing said animal neck region in said collar;
- connecting a lockable clasp located at the distal end of a leash to said collar buckle, said clasp preventing operation of said collar buckle to prevent enlargement of said collar and removal of said collar from said animal neck region;
- locking said lockable clasp to prevent unauthorized disconnection of said lockable clasp from said collar buckle;
- forming a loop in a proximal end of the leash, said loop formed between first and second leash portions and adapted for encircling a support structure; and,
- locking said first and second leash portions relative to each other to prevent removal of said loop from said leash.

* * * * *